United States Patent [19]
Hartmeister

[11] Patent Number: 5,983,560
[45] Date of Patent: Nov. 16, 1999

[54] AERIFIER CORE MULCHER

[76] Inventor: Ruben Hartmeister, 1034 6th St, Golden, Colo. 08403

[21] Appl. No.: 08/948,861

[22] Filed: Oct. 10, 1997

[51] Int. Cl.$^6$ ....................................................... A01G 7/00
[52] U.S. Cl. ..................................................................... 47/9
[58] Field of Search ......................................................... 47/9

[56] References Cited

U.S. PATENT DOCUMENTS

| | | | |
|---|---|---|---|
| 2,105,805 | 1/1938 | Challis | 47/9 |
| 3,015,188 | 1/1962 | Reinecker et al. | 47/9 |
| 3,204,589 | 9/1965 | Blackhurst et al. | 47/9 |
| 3,234,691 | 2/1966 | Cowell | 47/9 |
| 3,241,173 | 3/1966 | Finn | 47/9 |
| 3,460,493 | 8/1969 | Stephenson et al. | 47/9 |
| 3,468,267 | 9/1969 | Morris et al. | 47/9 |

*Primary Examiner*—Michael J. Carone
*Assistant Examiner*—Joanne C. Downs
*Attorney, Agent, or Firm*—Rick Martin

[57] ABSTRACT

A sod plug mulcher is towed behind a sod plugger preferably on a golf course, park land, or grass playing surfaces. The sod plugger punches holes in the turf and creates sod plugs. The sod plug mulcher catches the sod plugs and processes them into a fine mulch. The sod plug mulcher has a roller assembly to flatten the sod plugs. Then a series of spinning hammer blades chop the flattened sod plugs into a mulch inside a rotating drum. A spreader tray then throws the mulch back onto the golf course.

18 Claims, 11 Drawing Sheets

AERIFIER CORE MULCHER

FIELD OF INVENTION

The present invention relates to recycling dirt plugs known as cores that are created by a sod plugger known as an aerifier.

BACKGROUND OF THE INVENTION

Golf course fairways require constant grooming to ensure a good playing surface. Traditionally a tractor pulls a sod plugger periodically over the fairway. The sod plugger aerates the turf by punching holes in the turf thereby creating sod plugs also known as sod cores as a by-product. The sod plugs are dirt cylinders about three inches long. They may contain grass, roots, rocks, clay, and thatch. These sod plugs must be removed in order to play golf. The sod plugs are composed of valuable top soil.

Traditionally the sod plugs are either raked up manually, swept up by a powered sweeper, cut up, or left on the ground. It is desirable to recycle the dirt back into the lawn. Sometimes they are further processed into mulch by hand methods or running lawnmowers over them. These methods are time consuming. Additionally, the sod plugs must dry out before sweeping is possible due to the sticky composition of the dirt and clay mixture in the sod plug. Sometimes valuable playing time is lost using these methods.

The present invention solves both the problem of losing valuable playing time and the loss of the dirt compost from the turf. The plug mulcher is towed directly behind the sod plugger during the aeration process. The sod plugs are captured directly from the sod plugger into the plug mulcher. The plug mulcher then crushes the sod plugs and feeds them into a rotating drum also known as a hammer mill. The rotating drum has spinning hammer blades which pulverize the sod plugs into small dirt particles. The small dirt particles are recycled back into the turf with a spreader.

SUMMARY OF THE INVENTION

The main aspect of the present invention is to catch sod plugs from a sod plugger and recycle them into the turf.

Another aspect of the present invention is to provide for catching golf balls and stones without harming the machine.

Another aspect of the present invention is to clean the plug mulcher during operation to prevent dirt build-up and down time.

Yet another aspect of the present invention is to continuously pulverize the sod plugs, large uncut grass particles, weed patches and the like before recycling them onto the turf.

Other objects of this invention will appear from the following description and appended claims, reference being made to the accompanying drawings forming a part of this specification wherein like reference characters designate corresponding parts in the several views.

The plug mulcher has caster wheels and a frame that is towed behind a sod plugger. The tandem machines are towed by a tractor.

A sod plug catcher has a conveyer which feeds the sod plugs into a roller assembly. The roller assembly flattens the round sod plugs into an oval-shaped dirt cake which may contain grass, compost, sand and roots as well. The dirt cakes are then dropped onto a feeder chute which feeds the dirt cakes into the revolving drum. The revolving drum performs the mulching function. The revolving drum has an outer periphery with fixed blades set close together in an alternating pattern with screen plates. Inside the drum, a plurality of swinging knives, also called hammer blades, smash the dirt cakes against the fixed blades. As the fixed blades clog, a brush and air stream clean the fixed blades. The effect of the swinging blade and fixed blade combination is to pulverize the dirt cakes into a fluffy mulch which is dropped onto a rotating spreader tray. The fluffy mulch is thrown onto the turf. An engine powers all the moving components by means of belt drives and a gear boxes. Alternatively, a tractor-powered shaft can supply the necessary motive force for the present invention (not shown).

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DESCRIPTION OF THE PREFERRED EMBODIMENT

Figure 1:
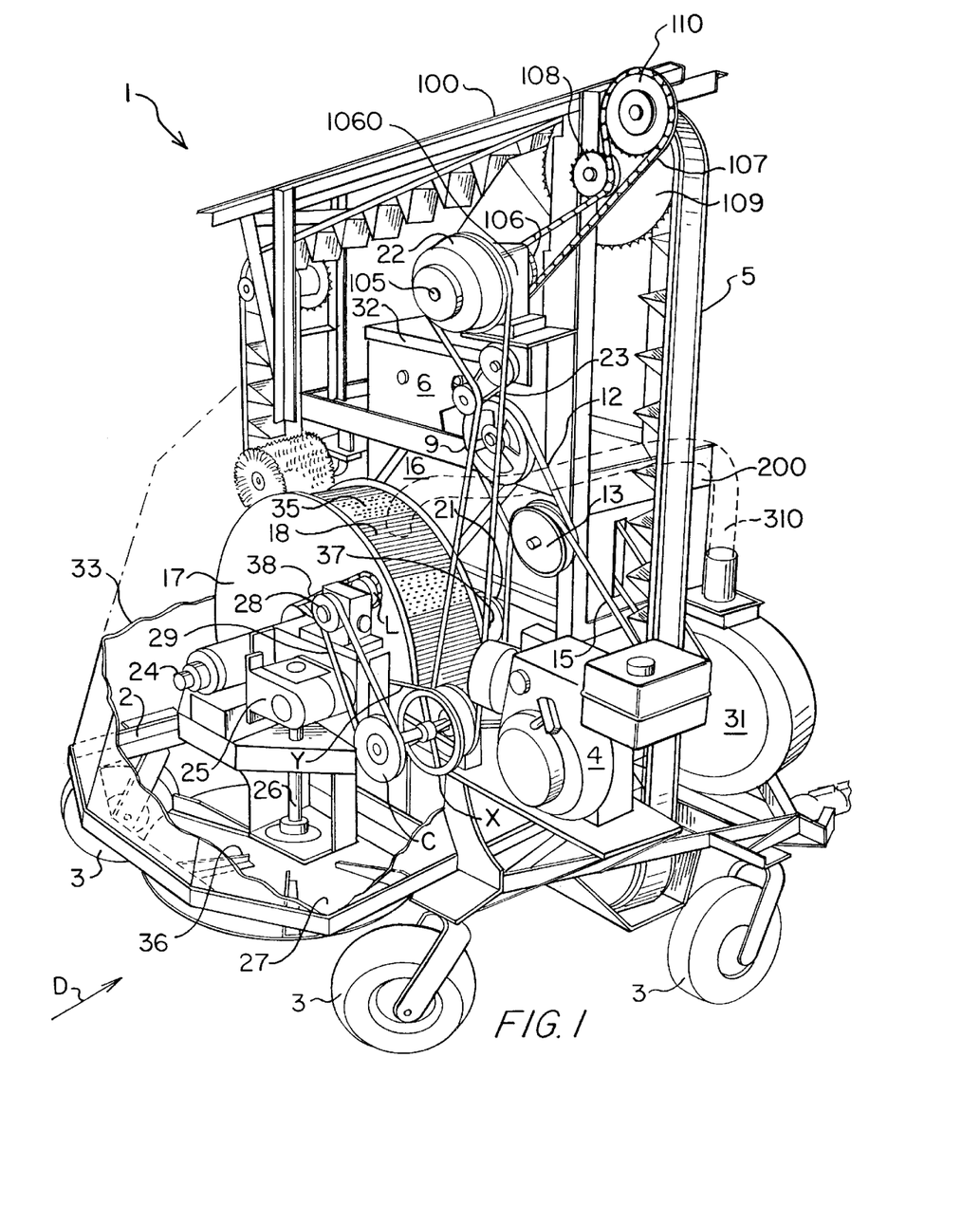
FIG. 1 is a top rear perspective view of the preferred embodiment with the cover shown in sectional view and removed.
Figure 17:
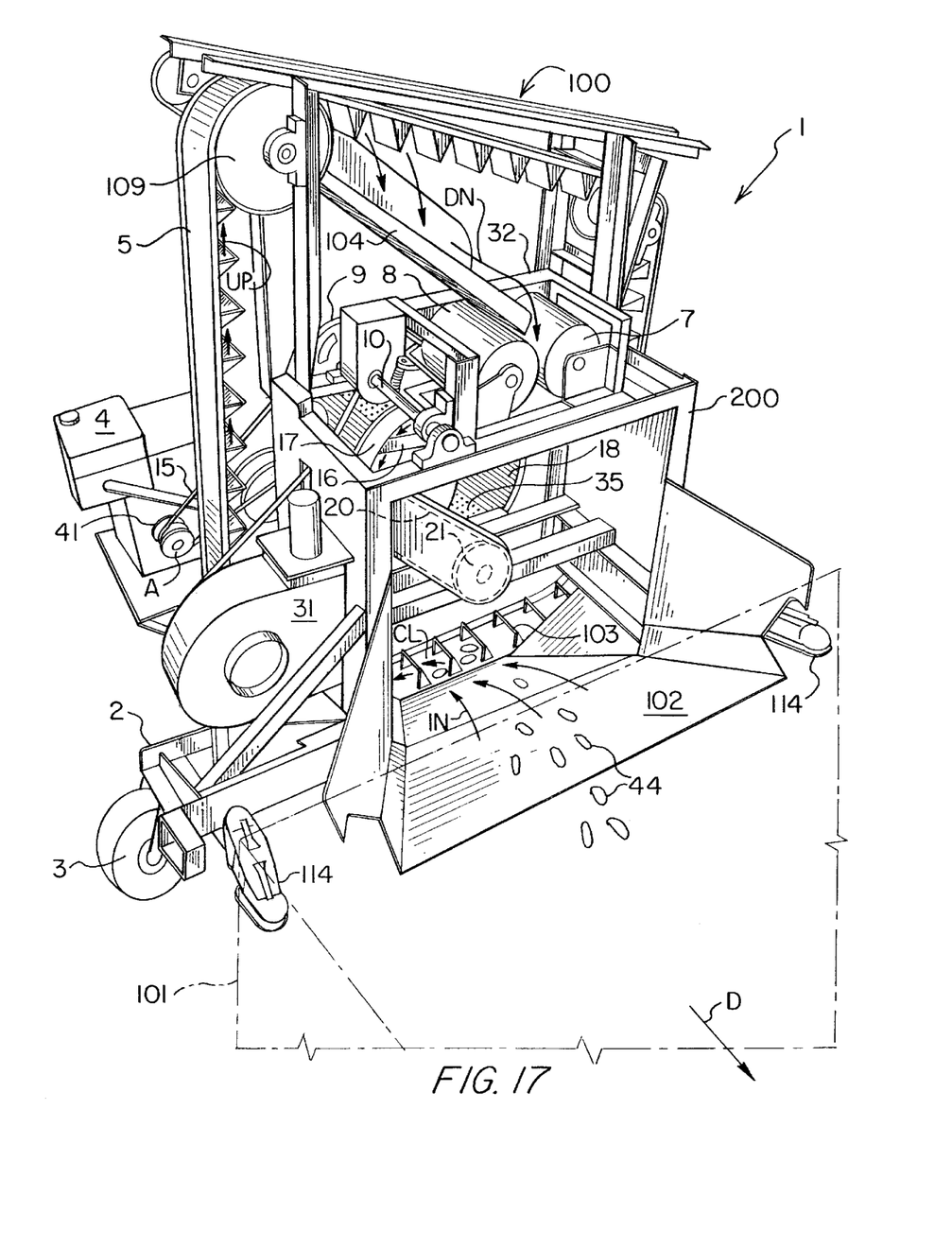
FIGS. 17 and 18 are rear perspective views of the sod plug feed assembly.
Figure 18:
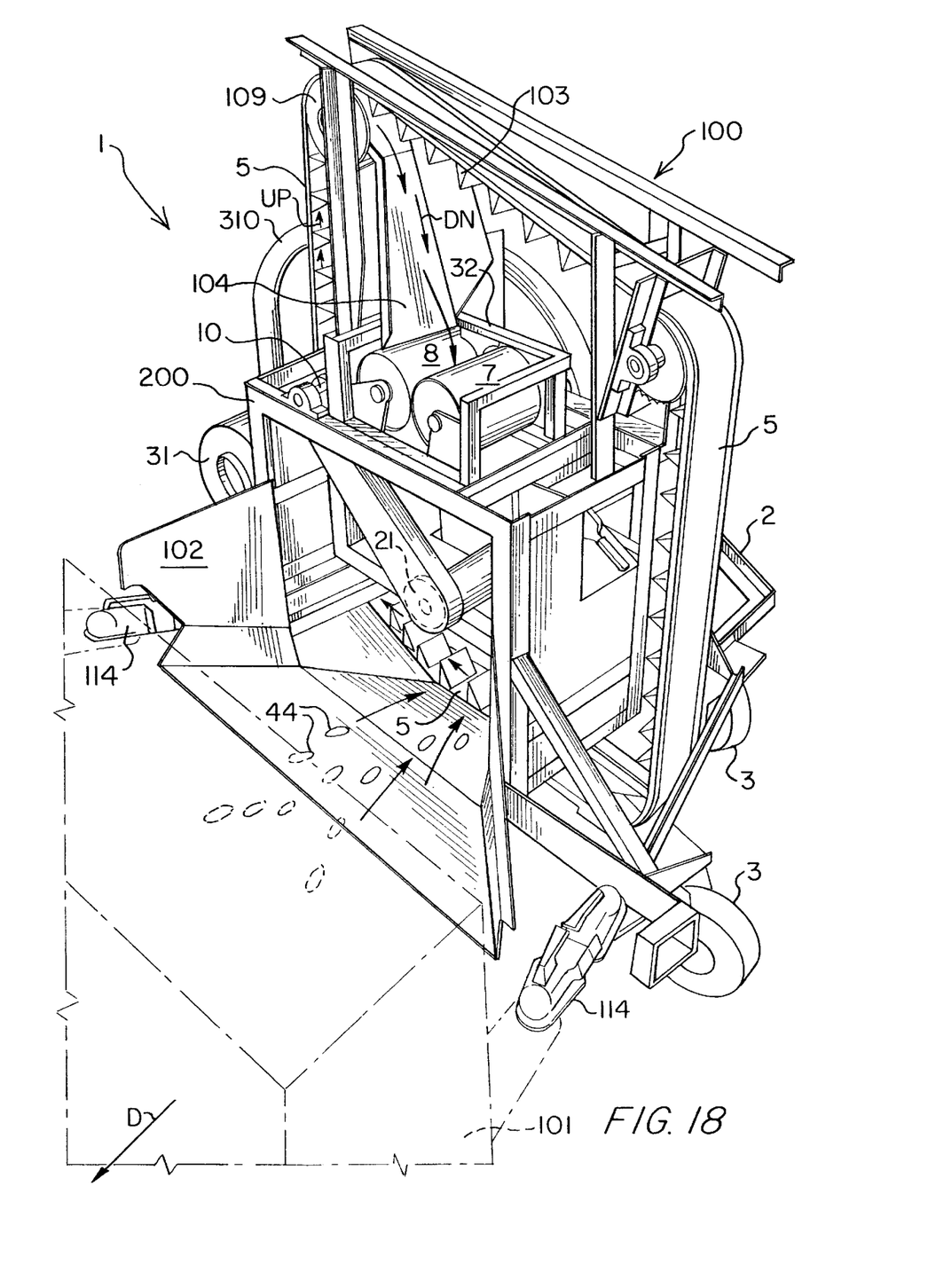

Referring first to FIG. 1 the plug mulcher 1 is comprised of a vertical frame 200 mounted atop a horizontal frame 2. The horizontal frame 2 has four caster-type wheels 3 which travel in direction D as towed behind a sod plugger 101 (FIGS. 17 and 18). The plug mulcher 1 is designed to be towed behind a sod plugger 101 (see FIGS. 17 and 18) preferably on a golf course turf. As the sod plugger 101 punches the turf creating sod plugs 44, the plug mulcher 1 catches the sod plugs in its conveyor hopper 5. From the conveyor hopper 5, the sod plugs are dropped into the roller assembly 32. The roller 7 is slightly eccentric whereas the roller 8 is a perfect cylinder. Also the roller 8 is spring-loaded to allow rocks to pass between the rollers 7, 8 without damaging the rollers. The eccentricity provides for molding the initially round sod plugs into generally flat dirt cakes 45. Another option is to rotate one roller faster than the other roller to provide a suction action on the sod plugs and further smashes the sod plugs between the two rollers. Additionally, rotating one roller faster grips the sod plugs and draws them through the rollers. The open half cycle allows the sod plug 44 to become engaged between the two rollers. The closed half cycle squeezes the sod plugs and draws them through the rollers.

The dirt cakes 45 exit the roller assembly 6 into the feeder chute 16. The feeder chute 16 drops the dirt cakes 45 into the drum 17 which is rotating. The beater assembly 34 shown in FIGS. 12, 13 smashes the dirt cakes 45 against the peripheral blades 18, thereby reducing the dirt cakes 45 to a fine mulch. The mulch drops through the exit screens 35 of the drum 17 onto the spreader tray 27. The spreader tray 27 has ejection blades 36 which propel the mulch to the ground as the spreader tray 27 rotates. The gear box 25 and drive shaft 26 rotate the spreader tray 27.

Figure 2:
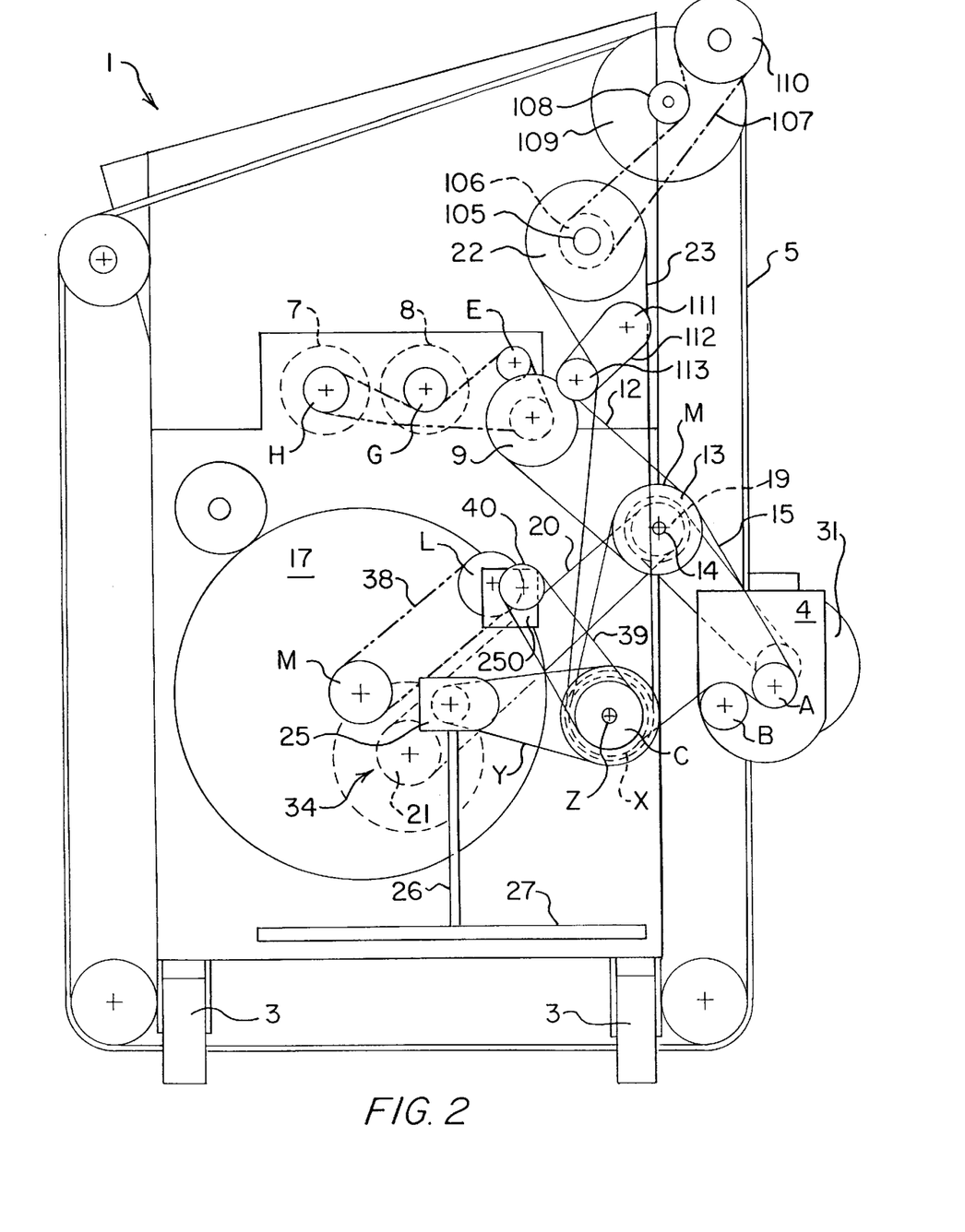
FIG. 2 is a diagrammatic view of the drive train of the preferred embodiment shown in FIG. 1.

Referring next to FIG. 2 the power train is shown from the rear perspective. The engine drive shaft A drives belt 15 which drives pulleys 13 and X. Pulley 13 also drives pulley 9 with belt 12. Pulley 13 also turns an axle 14 which has a pulley 19 which drives belt 20. Belt 20 drives pulley 21 which turns axle 37 which turns the beater assembly 34. See FIG. 12.

Pulley 9 turns sprocket F which powers the chain 11 and rollers 7, 8. Sprocket F serves to align the chain 11 while sprockets H, G transmit the power of the chain. Pulleys L, M and belt 38 drive gear box 250 which turns the drum 17. Pulley 40 is powered by belt 39 and pulley X. Pulley 40 rotates the drum 17.

Pulley X turns shaft Z which drives belt Y, pulley C, and belt 23. Belt 23 turns pulley 22 which via shaft 105 turns pulley 106, thereby turning belt 107. Belt 107 powers the pulley 108 which turns the conveyor drive pulley 109. Pulley 110 serves to adjust the tension in belt 107. Pulleys 111 and 113 serve to provide an idler arm on the gear box 1060 drive for the conveyor 5 via belt 112. Belt Y powers the gear box 25.

Figure 3:
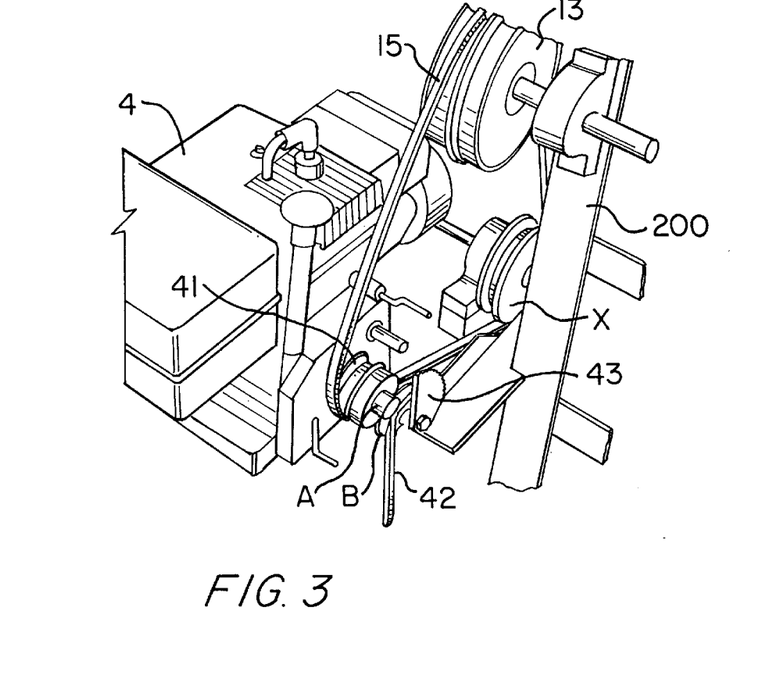
FIG. 3 is a top perspective view of the idler assembly functioning as a clutch.

Referring next to FIG. 3 the engine drive shaft A can be seen. It has a pulley 41. The belt 15 has been put in a neutral position with tension lever 42 which moves idler pulley B.

Figure 4:
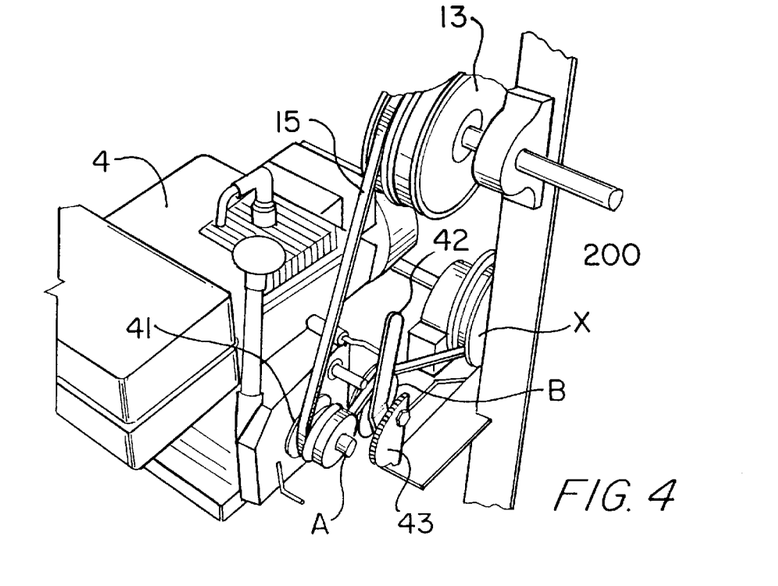
FIG. 4 is the same view as FIG. 3 with the clutch engaged.

In FIG. 4 the tension lever 42 has been moved to the engage position taking up the slack in belt 15. The lock 43 engages the frame 200 and keeps the tension lever 42 in the engaged position.

Figure 5:
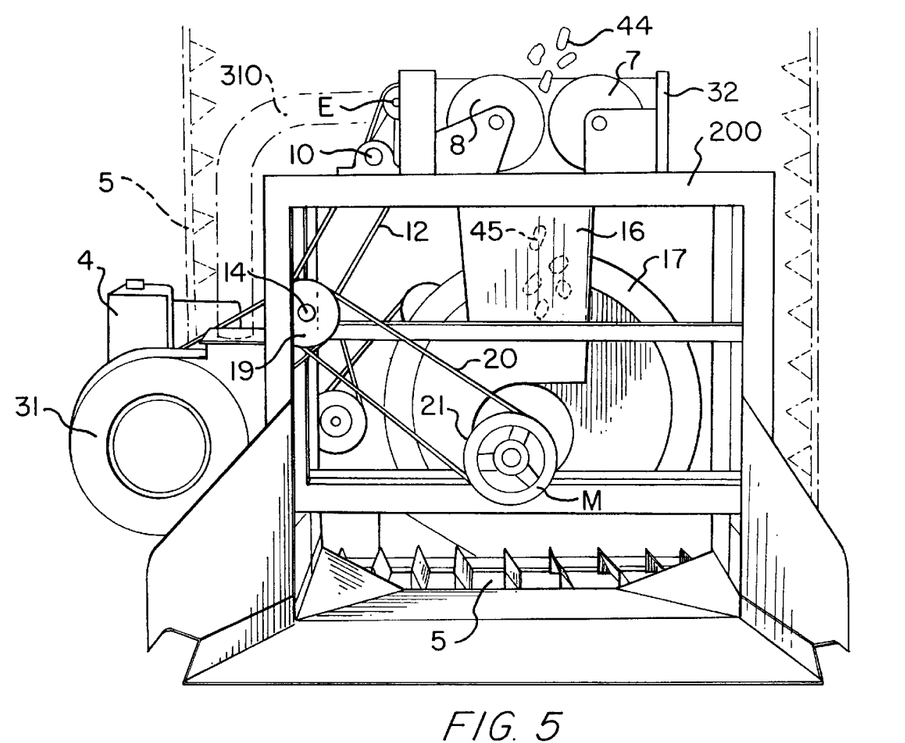
FIG. 5 is a front perspective view of the plug mulcher shown in FIG. 1.

Referring next to FIG. 5 the sod plug feed assembly 100 shown in FIG. 17 has been removed as has the cover 33 in this rear plan view of the plug mulcher. The sod plugs 44 are pressed into dirt cakes 45 by the rollers 7, 8. Then they slide down the feeder chute 16 into the drum 17. The blower 31 helps clean the drum 17 with a hose 310 shown in FIG. 1.

Figure 6:
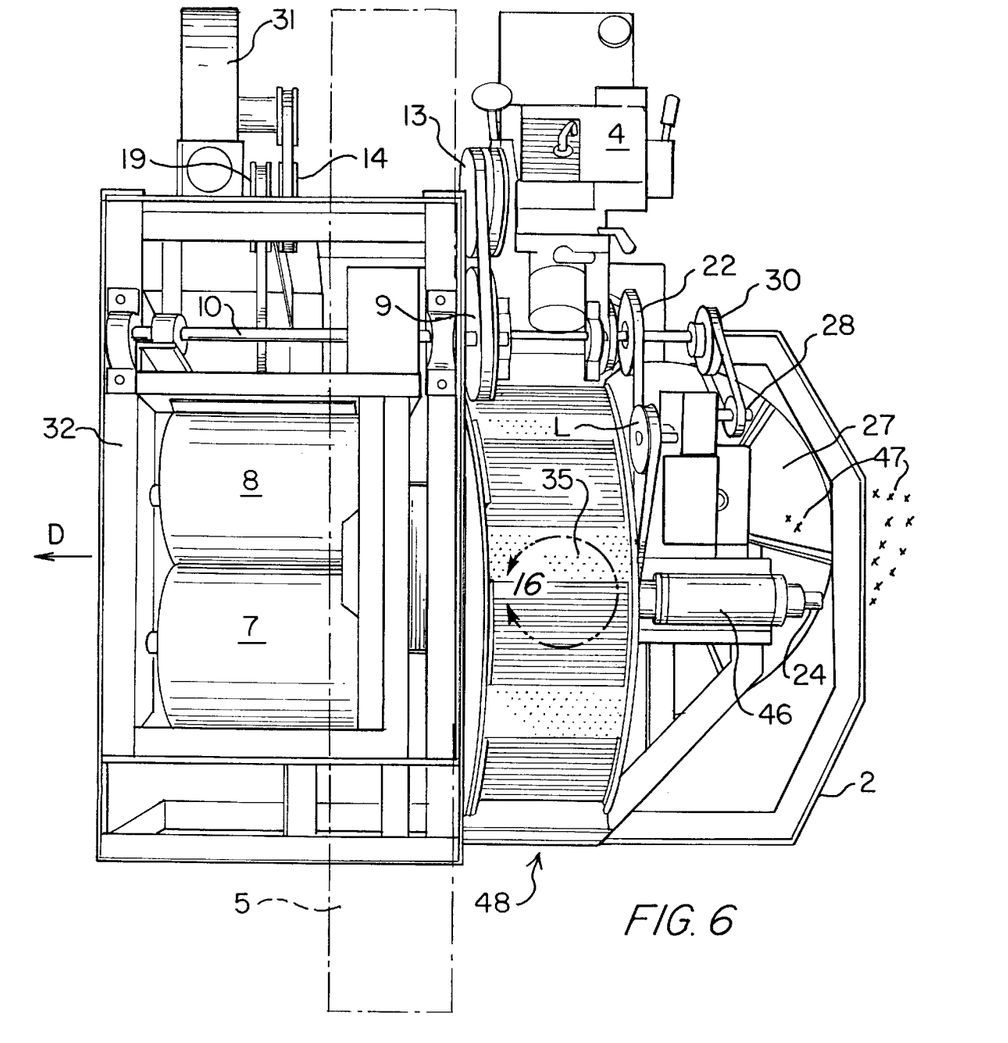
FIG. 6 is a top plan view of the plug mulcher shown in FIG. 1.
Figure 16:
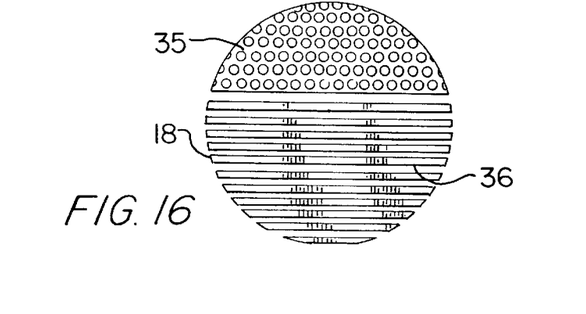
FIG. 16 is a close-up view of one segment of the peripheral blades and screen of the drum.

Referring next to FIG. 6 the cover 33 and the sod plug feed assembly 100 have been removed in this top plan view. The brush 300 and axle 301 shown in FIG. 14 has been removed. The drum axle 24 and shaft housing 46 can be seen. A trail of mulch 47 can be seen trailing behind the direction of travel D of the plug mulcher 1. The close-up of the drum perimeter 48 can be seen in FIG. 16. The peripheral blades 18 are sharpened on the inside surface to impact the dirt cakes 45 as the beater assembly 34 propels the dirt cakes 45 into the drum perimeter 48.

Figure 7:
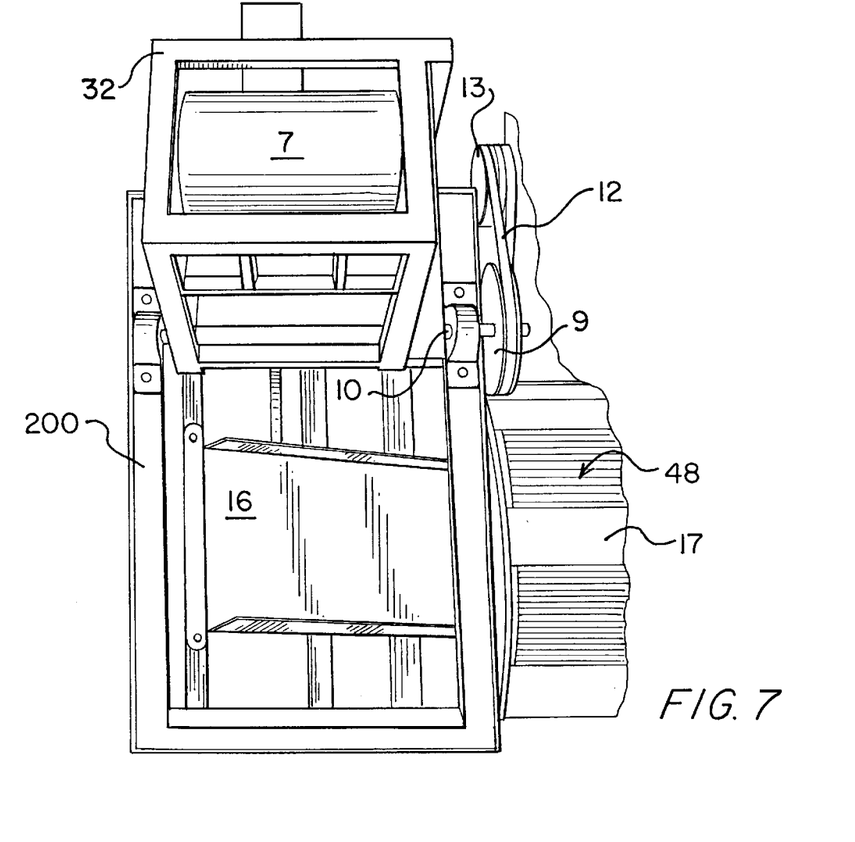
FIG. 7 is a top plan view of the roller assembly in the raised position for maintenance.

Referring next to FIG. 7 the roller assembly 32 has been tilted up for maintenance on the feeder chute 16. The axle 10 serves as a fulcrum.

Figure 8:
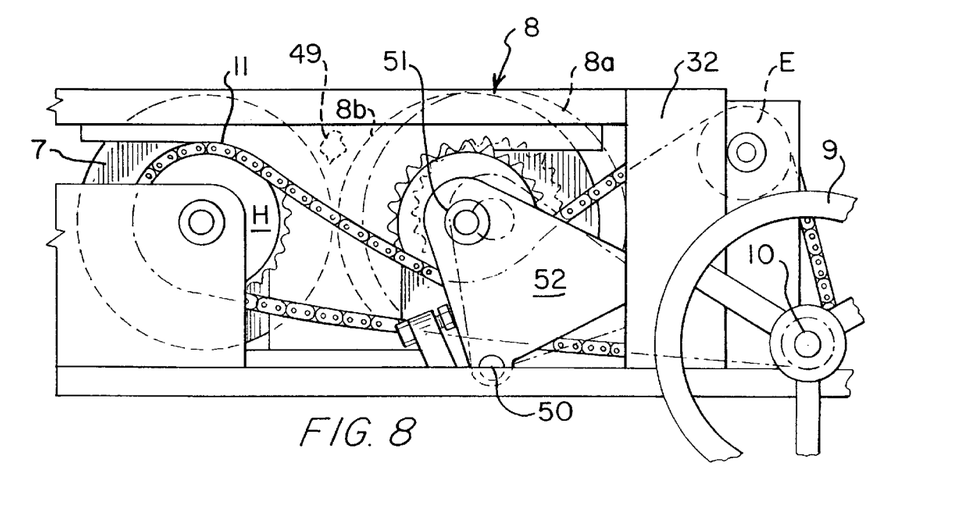
FIG. 8 is a cutaway back plan view of the roller assembly.

Referring next to FIG. 8 a rock 49 is shown entering between rollers 7, 8. Roller 8 is shown as retractable having a fully engaged position 8b and a retracted position 8a. A spring (not shown) drives the bracket 52 into the fully engaged position 8b. Bracket 52 supports shaft 51 which supports sprocket G and roller 8. The bracket 52 pivots around fulcrum 50.

Figure 9:
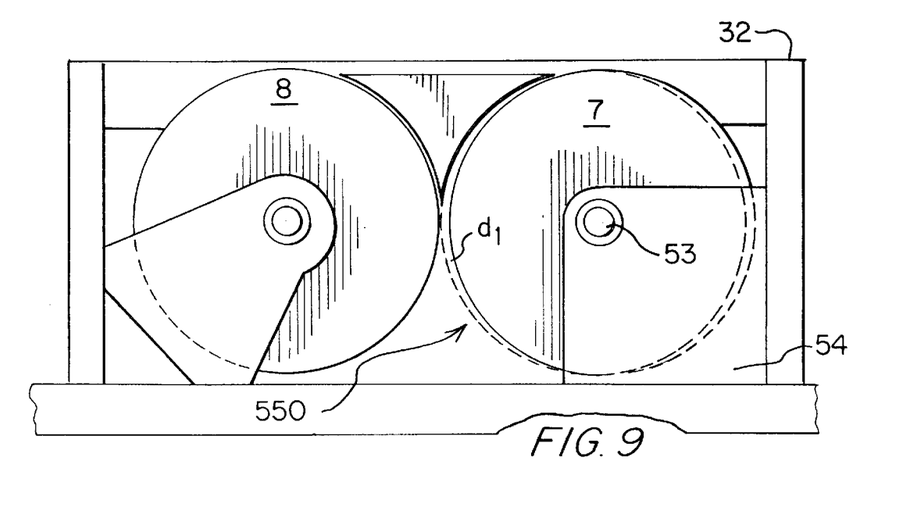
FIG. 9 is a cutaway front plan view of the roller assembly.

Referring next to FIG. 9 a rear plan view of the roller assembly 32 is shown. Roller 7 has a fixed mounting since axle 53 is bolted to bracket 54. Roller 7 is eccentric in shape as shown by the dotted lines which show the path the outside rolling surface 550 takes during operation. A small gap $d_1$ is periodically formed during each rotation of roller 7. This gap combined with the spring tension of roller 8 exerted by the spring (not shown) on bracket 52 enables the flattening of the sod plugs. This design minimizes maintenance of the roller assembly 32.

Figure 10:
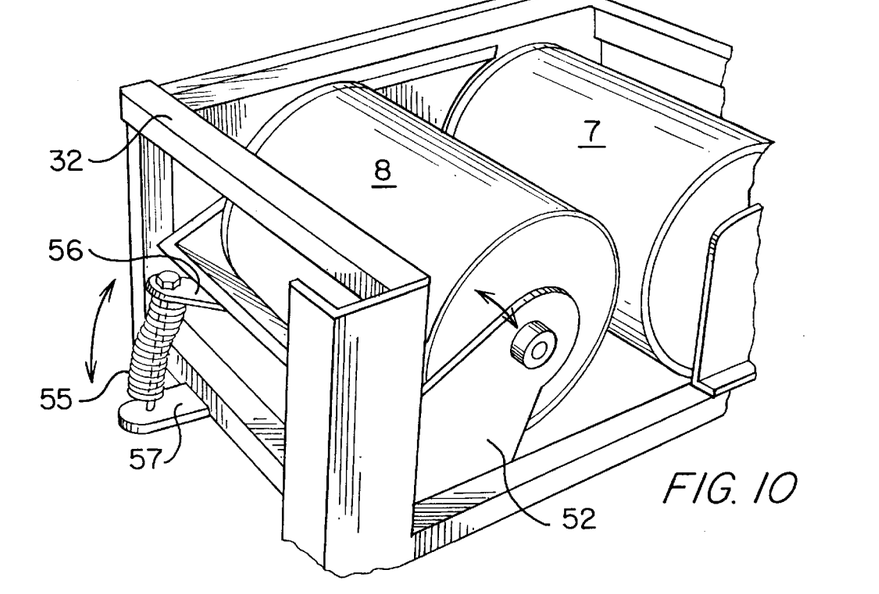
FIG. 10 is a top perspective view of the retraction portion of the roller assembly.

Referring next to FIG. 10 the rear perspective view of the roller assembly shows the spring 55 which drives the roller 8 into the fully engaged position. The bracket 52 has an extension 56 which compresses the spring 55 against the roller assembly frame member 57.

Figure 11:
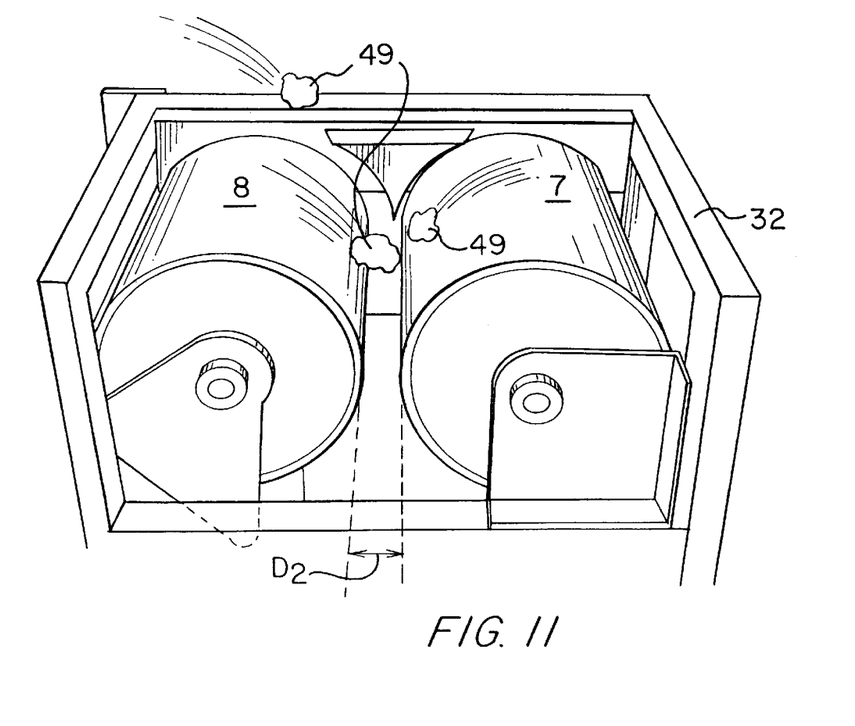
FIG. 11 is a top front perspective view of the roller assembly in operation.

In FIG. 11 rocks 49 have caused the roller 8 to move to the retracted position shown as 8a in FIG. 8. The gap $d_2$ allows golf balls to pass through. The plug mulcher is designed especially for golf course maintenance.

Figures 12, 13:
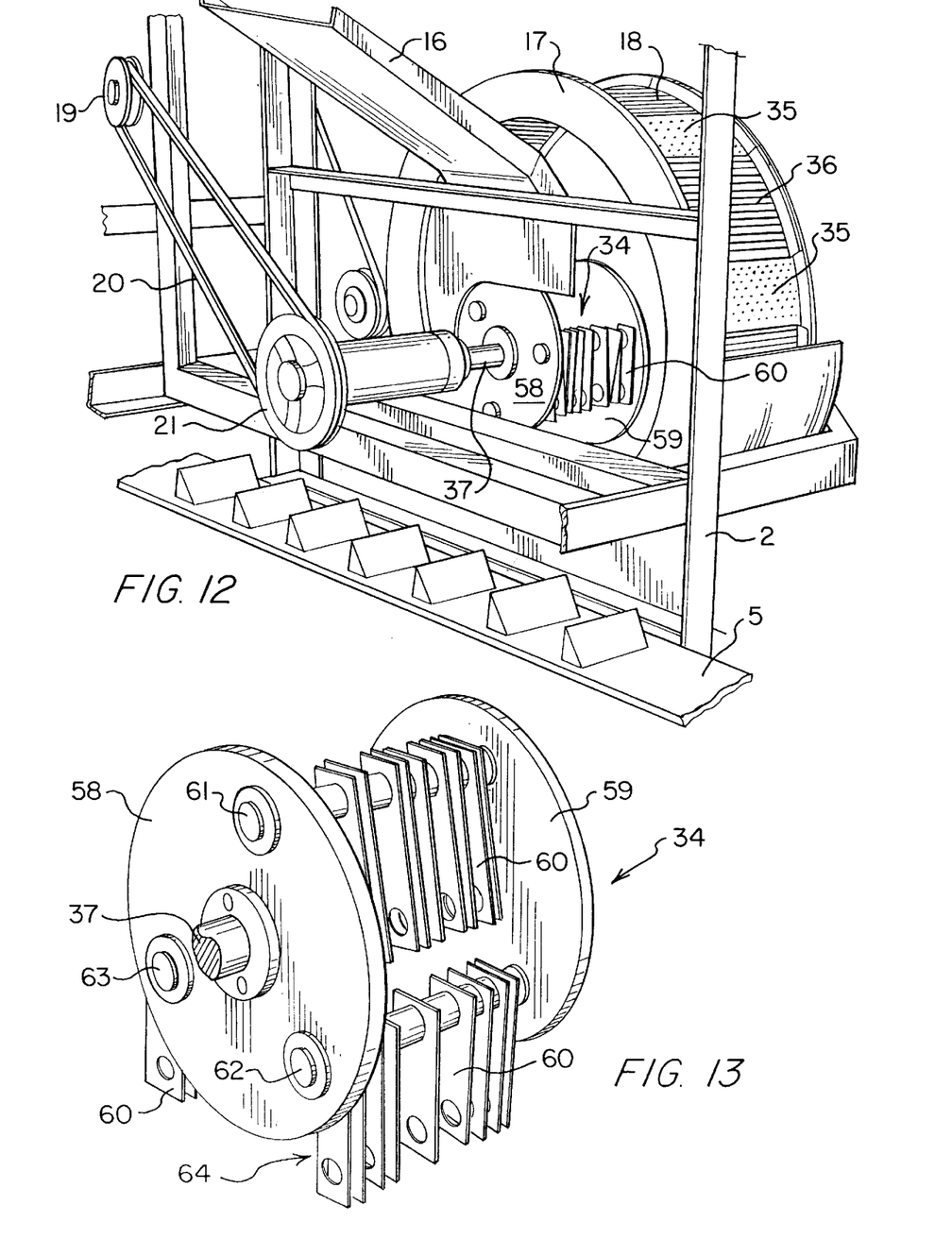
FIG. 12 is a side front perspective view of the drum and beater assembly.
FIG. 13 is a perspective view of the beater assembly.

Referring next to FIG. 12, 13 the front perspective view of the plug mulcher shows the beater assembly 34 in a stopped mode. The axle 37 is not rotating. The beater arms 60 are hanging from their support posts 61, 62, 63 which are in turn supported by the plates 58, 59. The cutting edge(s) 64 of the beater arm(s) 60 are sharpened in regular maintenance. The beater arms can be reversed and inverted to use all four corners of the blades.

Figure 14:
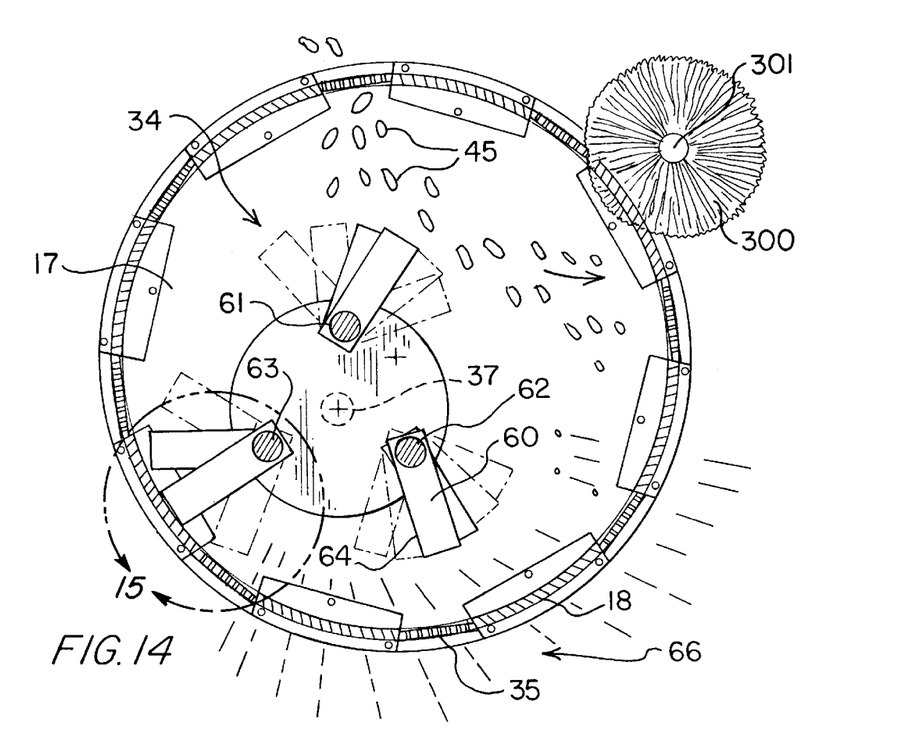
FIG. 14 is a front plan view of the drum and beater assembly in operation.
Figure 15:
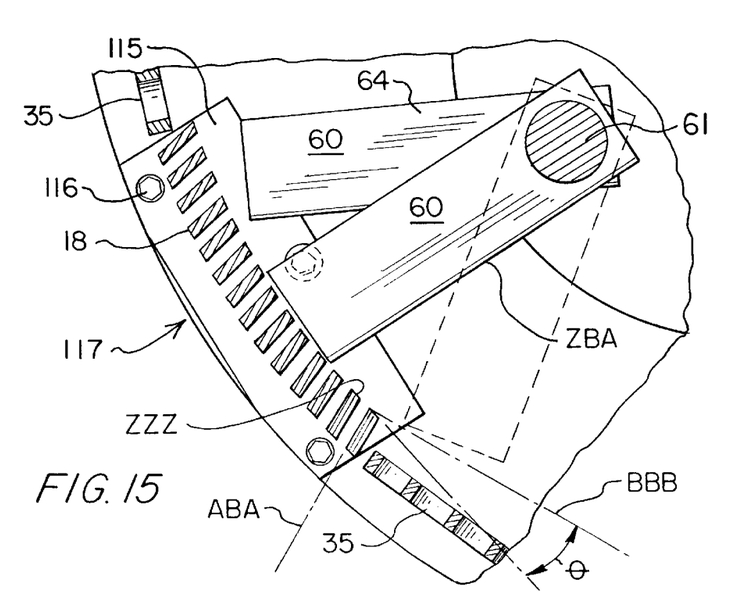
FIG. 15 is a close-up view of the beater arms of the beater assembly.

Referring next to FIGS. 14, 15 the heart of the mulching operation is shown. The flattened sod plugs 45 drop into the beater assembly 34. The spinning hammer blades 60 cut the flattened sod plugs 45 into segments 65 and propel them into the peripheral blades 18. This process is continued until a fine mulch 65 is ejected from the exit screen(s) 35. The brush 300 is supported by its axle 301. The brush 300 cleans the exit screen(s) 35 and peripheral blades(s) 18. The drum 17 is rotating in direction BAB. The hammer blades 60 have a sharpened cutting edge ZBA which propel the sod plugs 45 into the cutting edge ZZZ of the peripheral blades 18. The cutting edge ZZZ is set at 15°, angle θ, off the normal ABA of the peripheral plane BBB, and opposite the rotating direction BAB. Bolts 116 hold blade holder 115 to the periphery 117 of the drum 17.

Referring next to FIG. 17 the sod plug feed assembly 100 is shown delivering sod plugs into the roller assembly 32.

The sod plug feed assembly 100 consists primarily of a conveyor hopper 5. A prior art sod plugger 101 ejects sod plugs 44 which are collected in a scoop 102 affixed to the frame 2. The sod plugs travel in direction IN onto the conveyor hopper 5. Individual hoppers 103 transport the sod plugs 44 in direction UP as the conveyor hopper 5 moves in direction clockwise C as seen from the front of the plug mulcher 1. The sod plugs fall down in direction DN onto the ramp 104 and then into the roller assembly 32. Hitches 114 connect the sod plugger 10.1 to the frame 2.

Although the present invention has been described with reference to preferred embodiments, numerous modifications and variations can be made and still the result will come within the scope of the invention. No limitation with respect to the specific embodiments disclosed herein is intended or should be inferred.

| KEY | | | |
|---|---|---|---|
| 1. | Plug mulcher | 27. | Spreader tray |
| 2. | Horizontal frame | 28. | Drive pulley |
| 3. | Wheels | 29. | Belt |
| 4. | Engine | 30. | Drive Pulley |
| 5. | Conveyor hopper | 31. | Blower |
| 6. | Roller assembly | 32. | Roller assembly |
| 7. | Roller | 33. | Cover |
| 8. | Roller | 34. | Beater assembly |
| 9. | Drive pulley | 35. | Exit screen |
| 10. | Axle | 36. | Ejection blades |
| 11. | Chain | 37. | Axle |
| 12. | Belt | 38. | Belt |
| 13. | Drive pulley | 39. | Pulley |
| 14. | Axle | 40. | Pulley |
| 15. | Drive belt | 41. | Pulley |
| 16. | Feeder chute | 42. | Tension levers |
| 17. | Drum | 43. | Lock |
| 18. | Peripheral blades | 44. | Sod plug |
| 19. | Pulley | 45. | Flattened sod plug (dirt cake) |
| 20. | Belt | | |
| 21. | Pulley | 46. | shaft housing |
| 22. | Pulley | 47. | Mulch |
| 23. | Belt | 48. | Drum perimeter |
| 24. | Drum axle | 49. | Rocks |
| 25. | Gear box | 50. | Fulcrum |
| 26. | Drive shaft | A. | Engine drive shaft |
| 51. | Shaft | B. | Idler pulley |
| 52. | Bracket | C. | Pulley |
| 53. | Axle | D. | Direction of travel |
| 54. | Bracket | F. | Sprocket |
| 55. | Spring | G. | Sprocket |
| 56. | Extension | H. | Sprocket |
| 57. | Assembly frame member | L. | Pulley |
| 58. | Plates | N. | Pulley |
| 59. | Plates | X. | Pulley |
| 60. | Hammer blades | Y. | Belt |
| 61. | Support post | Z. | Shaft |
| 62. | Support post | CL. | Clockwise |
| 63. | Support post | UP. | Direction of travel |
| 64. | Cutting edge of beater arm | IN. | Direction of travel |
| 65. | Segments | DN. | Direction of travel |
| 66. | Mulch | | |
| 100. | Sod plug feed assembly | | |
| 103. | Hoppers | | |
| 104. | Ramp | | |
| 105. | Shaft | | |
| 107. | Belt | | |
| 108. | Pulley | | |
| 109. | Conveyor drive sprocket | | |
| 110. | Pulley | | |
| 111. | Pulley | | |
| 112. | Belt | | |
| 113. | Pulley | | |
| 114. | Hitches | | |
| 115. | Blade holder | | |
| 116. | Bolts | | |
| 117. | Periphery of drum | | |
| 200. | Horizontal frame | | |
| 250. | Gear box | | |
| 300. | Brush | | |
| 301. | Axle | | |
| 310. | Hose | | |
| 550. | Outside rolling surface | | |
| 1060. | Gear box | | |

I claim:

1. A sod plug mulcher comprising:

a sod plug feed assembly to catch sod plugs;

a roller assembly to flatten sod plugs;

a rotating drum having hammer blades to chop the sod plugs into a mulch;

a powered shaft to drive the sod plug feed assembly; and a frame having wheels for towing the sod plug feed assembly.

2. The mulcher of claim 1, wherein the roller assembly further comprises one eccentric roller and one cylindrical roller functioning to grip and flatten the sod plugs and to draw the sod plugs into the roller assembly.

3. The mulcher of claim 2, wherein the roller assembly further comprises a retractable roller to allow golf balls to pass through.

4. The mulcher of claim 3, wherein the roller assembly further comprises a hinged frame functioning to lift the roller assembly for maintenance.

5. The mulcher of claim 1 further comprising a rotating spreader tray under the rotating drum to eject the mulch.

6. The mulcher of claim 5, wherein the rotating drum further comprises a peripheral blade and a peripheral screen, wherein the sod plugs are repeatedly chopped between the hammer blades and the peripheral blade before the mulch is dropped through the peripheral screen onto the rotating spreader tray.

7. The mulcher of claim 6, wherein the rotating drum further comprises a rotating brush to clean the peripheral blade and the peripheral screen.

8. The mulcher of claim 7, wherein the rotating drum further comprises a blower and a hose to clean the peripheral blade and the peripheral screen.

9. The mulcher of claim 6, wherein the peripheral blade is set at an angle of approximately 15° off a normal to a peripheral plane and into a direction of rotation of the rotating drum.

10. The mulcher of claim 5, wherein the roller assembly receives sod plugs from the sod plug feed assembly which has a scoop located directly behind a sod plugger, and a chute feeds the sod plugs from the roller assembly to the rotating drum beneath it, and the rotating spreader tray is located beneath the rotating drum.

11. The mulcher of claim 10, wherein the sod plug feed assembly further comprises a hopper conveyor which receives the sod plugs from the scoop and delivers the sod plugs to the roller assembly.

12. The mulcher of claim 1, wherein the powered shaft further comprises a drive belt having an idler pulley and a neutral control lever.

13. The mulcher of claim 1 further comprising an engine to power the powered shaft.

14. A sod plug mulcher comprising:

a towable frame supporting a mobile sod plug mulcher;

a sod plug feeder to catch sod plugs mounted on the frame;

a sod plug roller mounted on the frame to receive and flatten sod plugs from the sod plug feeder;

a sod plug chopper mounted on the frame to receive sod plugs from the sod plug roller; and a power train to drive the sod plug feeder, sod plug roller and sod plug chopper.

15. The mulcher of claim 14, wherein the sod plug feeder further comprises a conveyor hopper.

16. The mulcher of claim 14, wherein the sod plug roller further comprises one eccentric roller and one cylindrical roller functioning to grip and flatten the sod plugs, wherein a retractable mechanism allows golf balls to pass between said rollers.

17. The mulcher of claim 14, wherein the sod plug chopper further comprises a rotating drum having internal hammer blades to chop the sod plugs into a mulch.

18. The mulcher of claim 14, wherein the power train further comprises:
an engine;
a powered shaft;
a drive belt having an idler pulley; and
a neutral control lever.

* * * * *